June 27, 1967

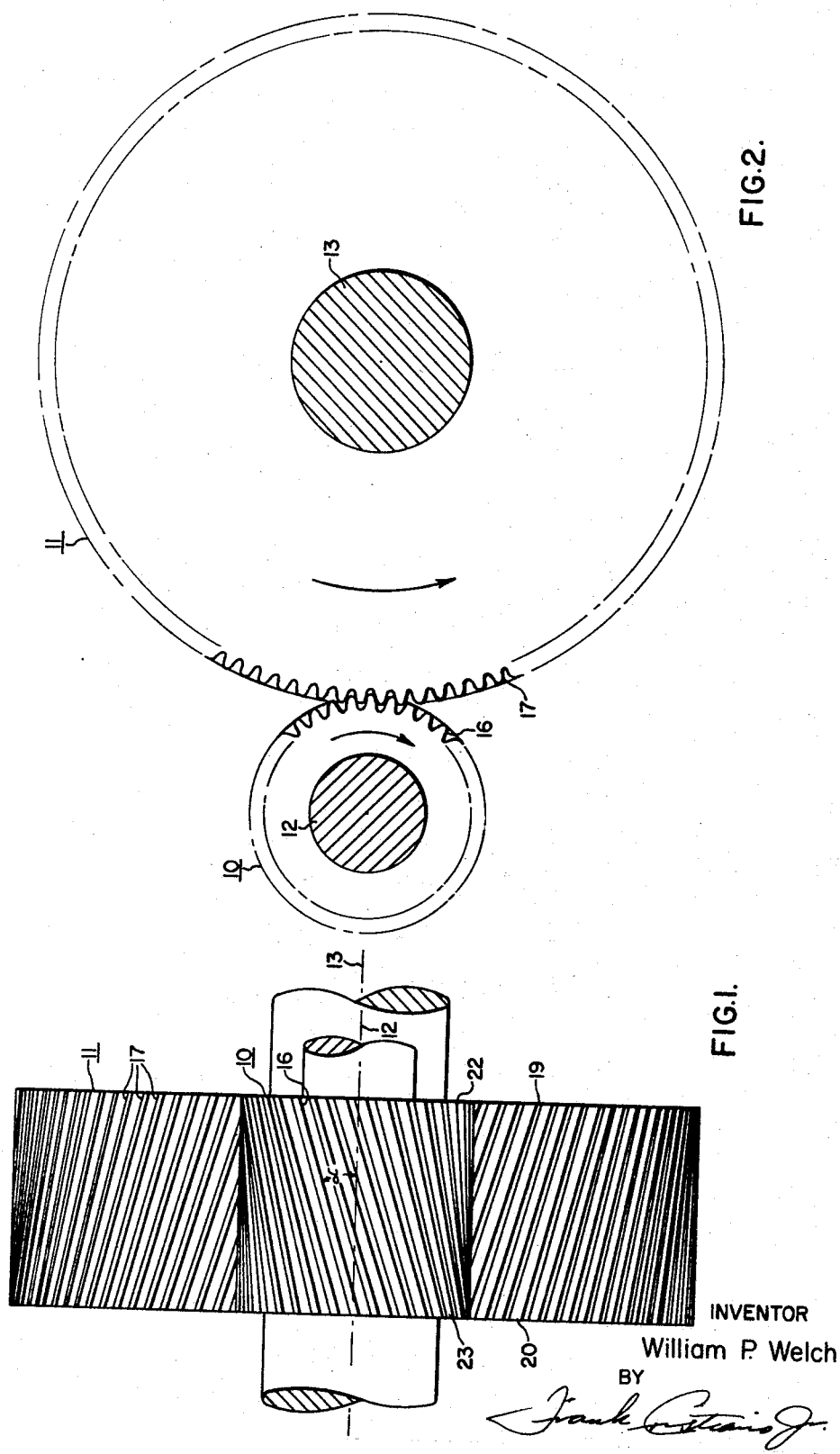

W. P. WELCH 3,327,548

GEARING

Filed Oct. 28, 1964

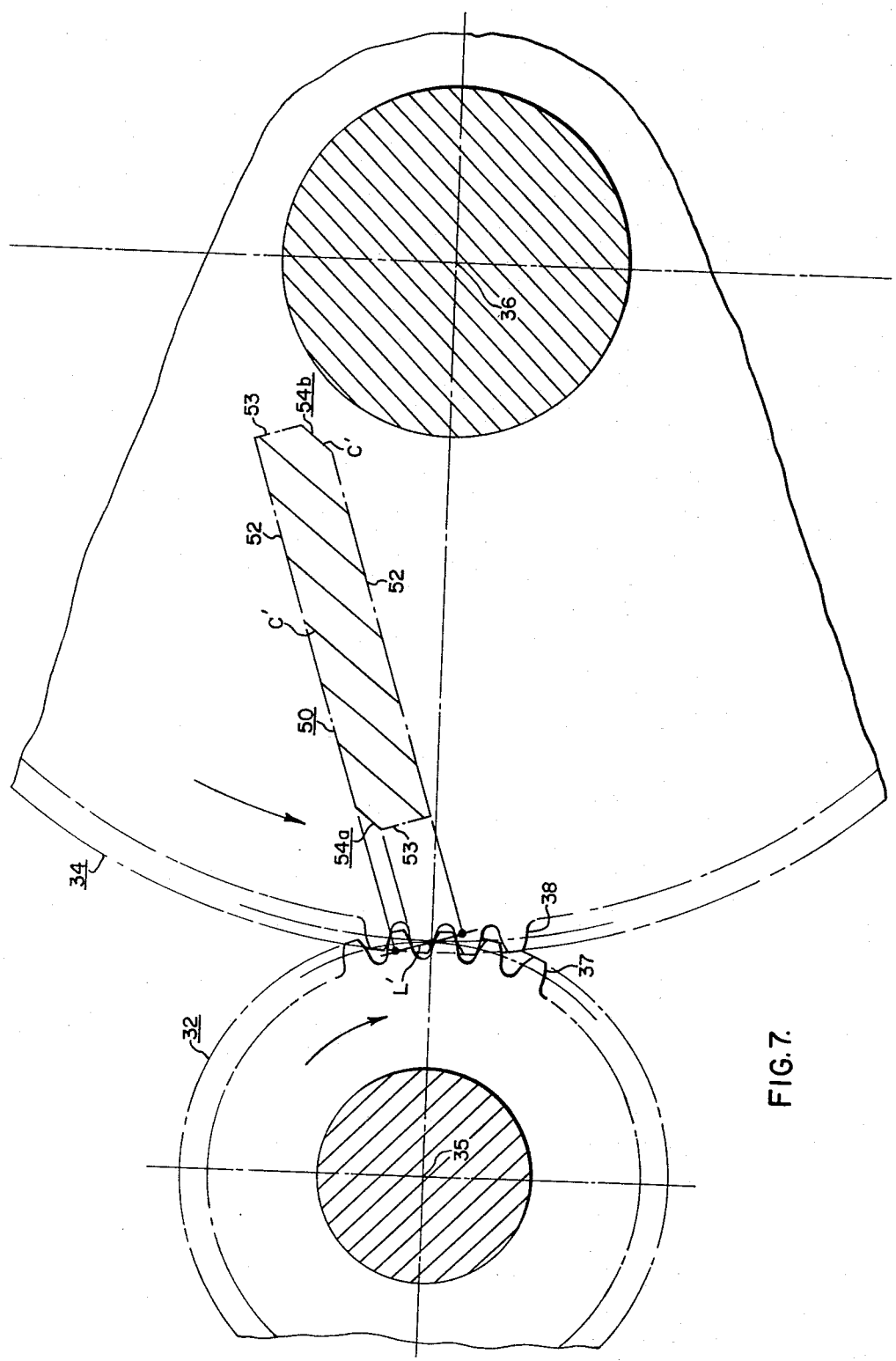

June 27, 1967 W. P. WELCH 3,327,548

GEARING

Filed Oct. 28, 1964

United States Patent Office

3,327,548
Patented June 27, 1967

3,327,548
GEARING
William P. Welch, Media, Pa., assignor to Westinghouse Electric Corporation, East Pittsburgh, Pa., a corporation of Pennsylvania
Filed Oct. 28, 1964, Ser. No. 407,010
12 Claims. (Cl. 74—410)

ABSTRACT OF THE DISCLOSURE

The invention relates to gearing of the type in which the lines of contact between meshing gears are inclined with the axis of rotation. In such gearing, initial contact between meshing gears is point contact and gradually increases to full line contact, so that, during initial contact, the gear teeth are excessively loaded. To minimize the above, the gear teeth are chamfered or cut away along lines parallel to the lines of contact to cause the initial contact to occur along a substantial line of contact.

---

This invention relates to gearing, more particularly to gearing of the type wherein the lines of contact between two mating teeth are not parallel to the pitch cylinders or the axes of the gears, and has for an object to provide improved gearing of this type.

In gearing, the path of action in gears is known as the line of action and, for example in involute gears is the straight line passing through the pitch point and tangent to the base circles, the base circles being the circles from which the gear tooth profiles are derived.

In mating spur gears, since the teeth are parallel to the rotational axes of the gears, the lines of contact and the line of action lie in a plane called the plane of action, and the lines of contact are normal to the line of action. Hence, in mating spur gears, the lines of contact extend the entire length of the teeth throughout the entire line of action. Since the lines of contact extend the entire length of the teeth, as explained above, the load on the gear teeth is uniformly distributed over the surfaces of the meshing teeth during their entire movement through the line of action, including initial engagement and final disengagement.

In mating helical gears or gears of the type in which the lines of contact between meshing teeth are diagonal or inclined with the axis of rotation, and thus not normal to the line of action, as the teeth on the gears enter the line of action, the initial contact is a point and then a line of contact of increasing length to a maximum.

Hence when tooth engagement is initiated, the end portion of the driven tooth undergoes a highly concentrated stress due to concentration of the load, first on a point and then on an incomplete line of contact. Conversely, as the teeth on the driving gear leave the line of action the line of contact decreases in length until it becomes a point, with similar effects.

Gearing of this type is employed to transmit great power, since a larger number of gear teeth (than in spur gearing) are continuously in mesh to distribute the load, and engagement and disengagement is smoother. However, the high contact stresses at the initial and final portions of tooth contact may cause undesirable pitting or scuffing to occur due to tooth distress under full power conditions.

Accordingly, an object of the invention is to provide, in gearing of the type in which the lines of contact are inclined with the line of action, an arrangement for minimizing pitting or scuffing during initial and/or final gear tooth engagement.

A still further object is to provide gearings of the above type in which the length of the initial and/or final line of contact between engaging and/or disengaging teeth may be maintained at any predetermined safe or desirable value up to the maximum length.

In accordance with the invention, the sensitive tooth area of initial contact is relieved by removing a portion of the teeth subjected to point or less than desired line contact, thereby delaying the meshing of mating gear teeth until they proceed along the line of action sufficiently to attain the required length of line contact.

The removal of the sensitive area may be obtained by chamfering the corners or ends of the gear teeth in such a manner that the faces of the gear teeth are cut away at substantially the same angle as the angle of inclination of the lines of contact. Stated another way, the chamfer is formed in such a manner that its intersection with the face of its associated gear tooth is substantially parallel to the angle of inclination of the lines of contact.

The above and the objects are effected by the invention as will be apparent from the following description and claims taken in connection with the accompanying drawings, forming a part of this specification, in which:

FIGURE 1 is a front view of a pair of conventional mating helical gear members;

FIG. 2 is a right-hand end view of the gears shown in FIG. 1;

FIG. 7 is a view similar to FIG. 3, but taken on line VII—VII of FIG. 4 and showing a portion of the gears in FIG. 4 and operating conditions attained along the line of action, in accordance with the invention;

Figure 3:
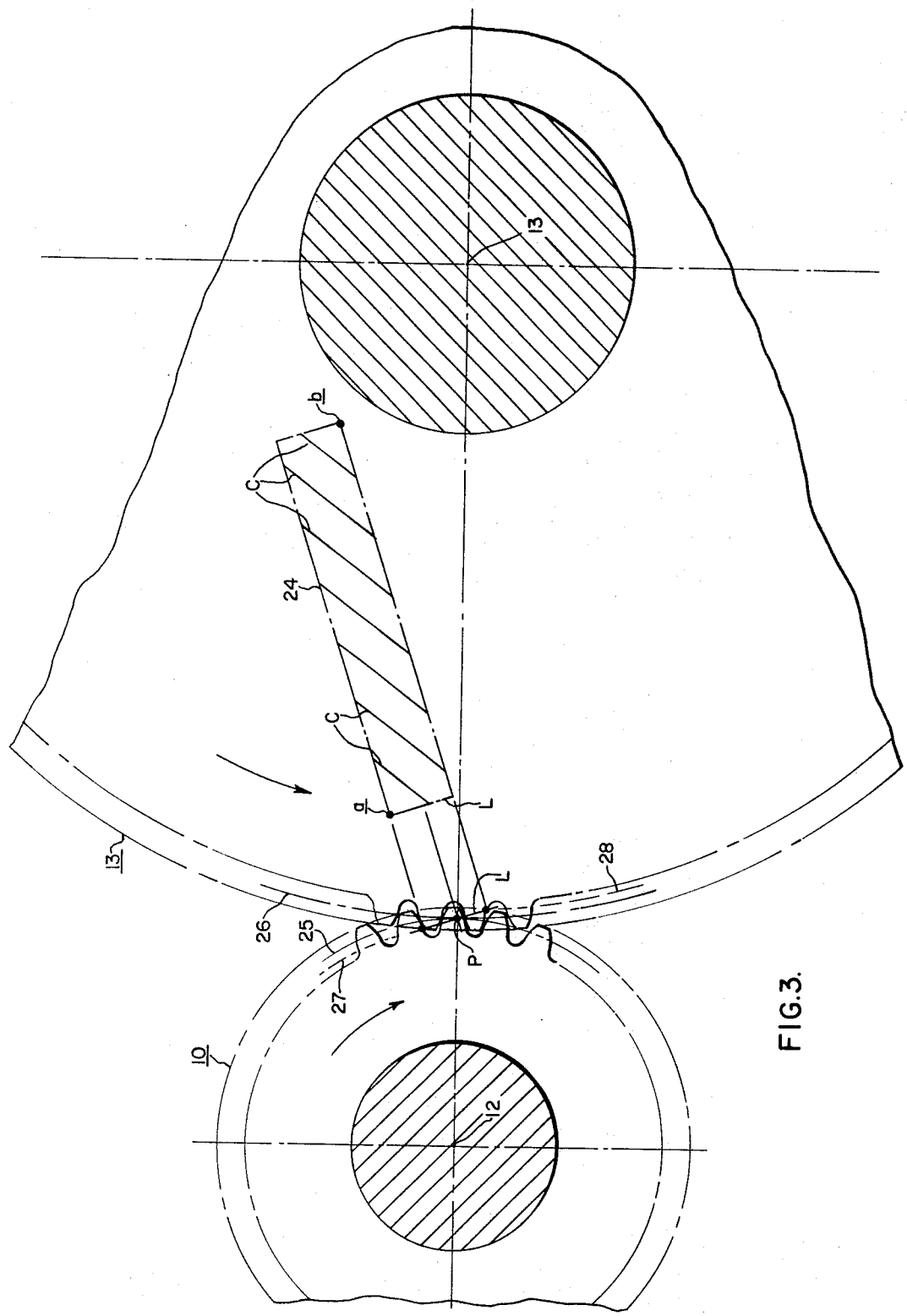
FIG. 3 is a greatly enlarged diagrammatic end view showing only a portion of the gears in FIG. 2 and illustrating operating conditions attained along the line of action.

Referring to the drawings in detail, FIGS. 1 and 2 illustrate a pair of conventional mating helical gear members 10 and 11, representative of the prior art to which the invention pertains and FIG. 3 illustrates operating conditions and the undesirable effects attained thereby.

The gears 10 and 11 are of the speed reduction type; hence the smaller gear or pinion 10 is the driving gear and the larger gear 11 is the driven gear. The gears 10 and 11 may be supported in any suitable manner (not shown) for rotation about their respective axes 12 and 13. The gear 10 is provided with a circumferential array of helical gear teeth 16 skewed at an angle with the gear axis 12 and disposed in a manner to mesh with a circumferential array of similar helical gear teeth 17 provided on the gear 11 and skewed at an angle with the gear axis 13. Since in the illustration shown, the two gear axes 12 and 13 are parallel to each other, and angle $\alpha$ (usually called the helical angle) is the same for both gears.

The gear teeth 16 and 17, as illustrated, are of the left-hand and right-hand helical types, respectively. Hence, when the driving gear 10 drives the driven gear 11 in the direction illustrated in FIGS. 2 and 3 by the arrows, the right-hand portions 19 of the gear teeth 17, when viewed as in FIG. 1, are termed the leading portions and their left-hand portions 20 are termed the trailing portions. Similarly, the right-hand portions 22 of the gear teeth 16 are termed the leading portions and the left-hand portions 23 are termed the trailing portions.

Referring to FIG. 3, there is shown diagrammatically a plane of action 24 illustrating conditions during engagement of the gear teeth 16 and 17. The plane of action 24 has been rotated 90° about a line of action L for convenience. Several mating teeth are in continuous engagement with each other during their movement through the line of action. The line of action L, as well known in the art, is the path of action of the meshing teeth and for involute gears is a straight line passing through the pitch point P located at the point of tangency of the pitch circles 25 and 26 of the gears 10 and 11, respectively, and tangent to the base circles 27 and 28 of the tooth profiles and is a projection of the plane of action 24. The mating teeth engage each other in the plane of action 24 which is a rectangular plane equal in length to the axial length of the gear teeth and having a width equal to the length of the line of action.

Since the gear teeth 16 and 17 are helical or extend spirally at an angle $\alpha$ (FIG. 1) about the periphery of their respective gears, their interengaging contact is along lines of contact C inclined with respect to the edges of the rectangular plane of action 24 and parallel to the base helical angle of the teeth. A grid of seven lines of contact C are illustrated in the plane of action 24, indicating that at least seven pairs of teeth are in continuous engagement. The first and last lines of contact are of shorter length than the five intermediate lines of contact, indicating that one of the driving gear teeth 16 has not yet fully engaged the associated driven gear tooth 17 in the first instance, and another of the driving gear teeth is terminating its engagement with its associated driven gear tooth. Accordingly, the first gear tooth pair and the last gear tooth pair are more heavily stressed at their leading edge portion 19 and trailing edge portion 23, respectively, since the stress is distributed over a shortened or incomplete line of contact C.

During operation, the grid of lines of contact C progresses from left to right, when viewed as in FIG. 3. Accordingly at initial contact, the driving gear teeth 16 make point contact with the driven gear teeth 17, as indicated by point $a$, then the contact increases in length from partial line contact to full line contact, and finally the contact decreases again until at final contact, the driven gear teeth 17 make point contact with the driving gear teeth 16 as indicated by point $b$.

The above phenomenon has been discovered to subject the leading end portions 22 of the driving gear teeth 17 and the trailing end portions 20 of the driven gear teeth 16 to highly concentrated loading forces which usually cause scuffing and pitting of the teeth in these regions which may lead to premature wear of the affected regions or even breakage of these end portions.

Such loading forces are considered to be excessive and dangerous in the tooth regions extending from the point $a$ until the length of the line of contact is at least 20% of a full line of contact, and in the regions extending from the point $b$ in reverse direction to where the line of contact decreases to at least 20% of its full value.

Figure 4:
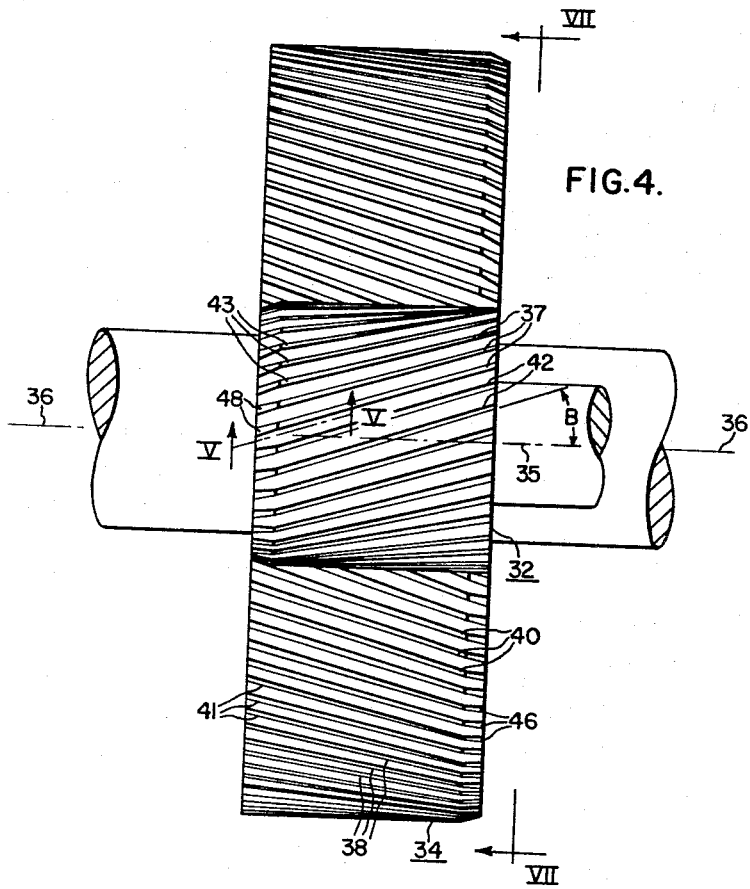
FIG. 4 is a front view of a pair of mating helical gear members formed in accordance with the invention.

In accordance with the invention, there is shown in FIG. 4 a pair of mating involute helical gear members 32 and 34, similar to the gear members 10 and 11, but formed in a manner to reduce the excessive tooth stresses at initial and final contact described above. The gears 32 and 34 are of the speed reduction type; hence the smaller gear or pinion 32 is the driving gear and the larger gear 34 is the driven gear. The gears 32 and 34 may be supported in any suitable manner (not shown) for rotation about their central axes 35 and 36, respectively and, as illustrated, their axes are disposed in parallel relation with each other.

The driving gear 32 and driven gear 34 are each provided with respective circumferential arrays of helical gear teeth 37 and 38, skewed at a helical angle B with their gear axes and disposed in a manner to mesh continuously with each other.

Here again, the gear teeth 37 and 38 are of the left-hand and right-hand spiral type, respectively. Hence, when the driving gear 32 drives the driven gear 34 in the direction illustrated in FIG. 7 by the arrows, the right-hand portions 40 of the gear teeth 38, when viewed as in FIG. 4, are termed the leading portions and the left-hand portions 41 are termed the trailing portions.

Similarly, the right-hand portions 42 of the teeth 37 are termed the leading portions and the left-hand portions 43 are termed the trailing portions.

Figure 6:
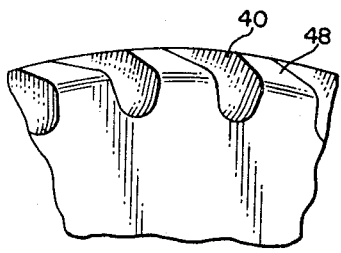
FIG. 6 is a fragmentary end view showing several of the gear teeth shown in FIG. 5.
Figure 5:
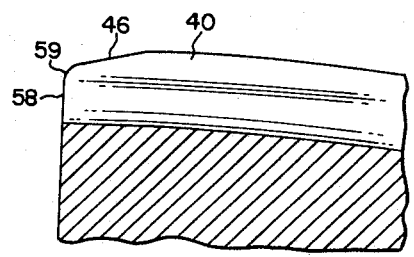
FIG. 5 is a greatly enlarged fragmentary sectional view taken on line V—V and showing one of the gear teeth in elevation.

To eliminate the initial point contact (reference $a$ in FIG. 3), the right-hand portions 40 of the driven gear teeth 38 are chamfered or beveled to provide inclined edge portions 46, as best shown in FIGS. 5 and 6. In a similar manner, to eliminate the final point contact, the left-hand portions 43 of the driving gear teeth 37 are beveled to provide inclined edge portions 48.

Referring to FIG. 7, there is shown diagrammatically a plane of action 50 illustrating condition during engagement of the gear teeth 37 and 38. Here again the plane of action 50 has been rotated 90° about the line of action L' for convenience and eight teeth are in engagement, as indicated by the lines of contact C'.

The line of action L' and the lines of contact C' are determined in the same manner as described in conjunction with FIG. 3 (prior art). However, the plane of action 50 is no longer a rectangle but an irregular hexagon, that is, a figure defined by three pairs of parallel sides 52, 53 and 54$a$ and 54$b$. The side 54$a$ coincides with the desired initial line of contact C', while the side 54$b$ coincides with the desired terminal line of contact C'.

The initial line of contact is determined by making the beveled edges 46 of the gear teeth parallel to the line that is the generator of the helical gear teeth and thus parallel to the lines of contact, and of a length sufficient to permit the initial line of contact C' to attain at least 20% of the complete lines of contact.

In effect, initial engagement of the leading portions 42 of the driving teeth 37 with the leading portions 40 of the driven teeth 38 is delayed by the beveled edges 46, since the leading portions subject to point stress and excessive line contact stress have been removed.

The terminal line of contact is determined by forming the beveled edges 48 in a similar manner, and in effect, the terminal engagement of the trailing tooth portions 41 and 43 is moved forward, since the trailing portion subject to point stress and excessive line contact stress has been removed.

The inclined edges 46 and 48 may be formed in any desired manner, for example by machining while turning the gears on a lathe, thereby to impart a frusto-conical configuration to the annular array of beveled edges 46 and 48 or by individually cutting away the undesirable portions to provide an annular series of inclined flat surfaces (not shown).

Also, although not essential to attain the objects of the invention, the end faces 58 of the gear teeth may be rounded, as indicated at 59, to minimize damage due to nicking during handling, as well known.

In this embodiment (FIGS. 4-7 inclusive) only the leading end portions 40 of the driven gear 34 are beveled and the trailing end portions 43 of the driving gear 32 are beveled, since the gears 32 and 34 are speed reduction gears always operated in the direction of the arrows in FIG. 7. However, if the direction of rotation is reversed, the leading and trailing end portions of the gear teeth are also reversed and the lines of contact attained during reverse rotation assume an inclination of opposite hand to the lines of contact C'. Accordingly, it may be desirable to bevel the opposite end portions 41 and 42 of the gear teeth. This is equally the case in the event the direction of load application is reversed with the rotation remaining as shown on FIG. 3, the gear set then becoming a speed increase gear.

Figure 8:
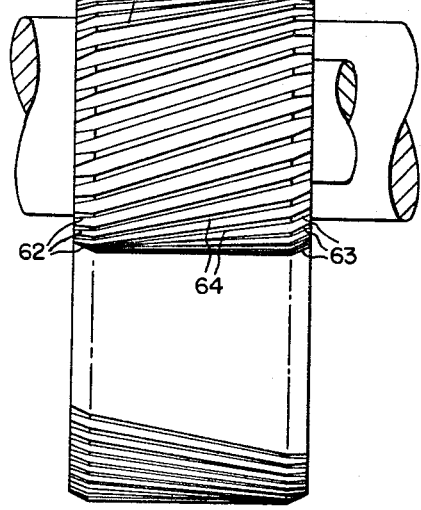
FIG. 8 is a front view of a mating pair of helical gears similar to those shown in FIG. 4 but illustrating a further modification, in accordance with the invention.

FIG. 8 illustrates gearing generally designated 60 that attains the objects of the invention regardless of the direction of rotation, or the direction of loading, and provides a driving (or driven) gear 61 having beveled portions 62 and 63 at both ends of the gear teeth 64, and a driven (or driving) gear 66 having beveled portions 67 and 68 at both ends of its gear teeth 69.

Figure 9:
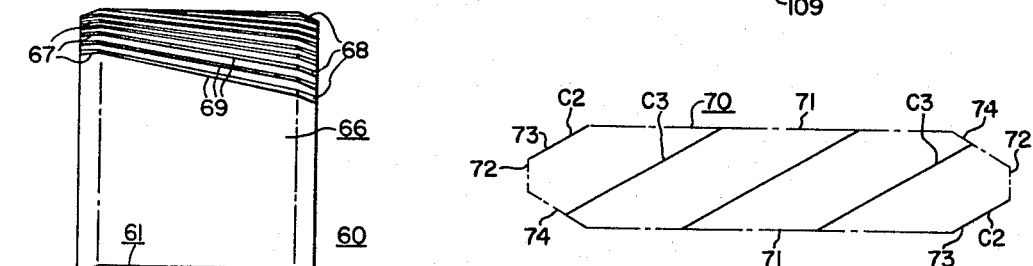
FIG. 9 is a diagram illustrating conditions along the plane of action when the gears in FIG. 8 are rotated in one direction.

When the driving gear 61 rotates the driven gear 66 in the same direction indicated in connection with the first embodiment, the resulting plane of action 70 (FIG. 9) is attained and the initial and final lines of contact $C^2$ are substantially similar in length to the lines of contact determined by the plane of action sides 54a and 54b (FIG. 7).

However, in this embodiment the plane of action 70 assumes an irregular octagonal shape with four pairs of sides 71, 72, 73 and 74 and the lines of contact $C^3$ do not attain their full length until they progress past the left side 74 of the plane of action and conversely diminish in length as they progress past the right side 74. However, by an inspection of FIG. 9 it will be seen that the length of the shortened lines of contact $C^3$ are considerably longer than the initial and final lines of contact $C^2$; hence the gear teeth are only moderately stressed during these portions of their engagement.

Figure 10:
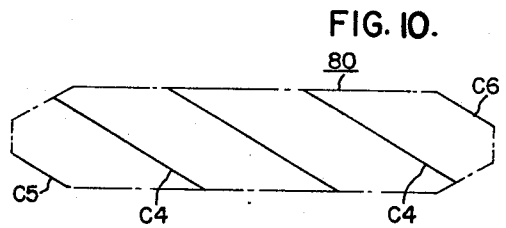
FIG. 10 is a diagram similar to FIG. 9 but illustrating conditions along the plane of action when the gears in FIG. 8 are rotated in the opposite direction.

In FIG. 10, there is shown a plane of action 80 attained when the gearing 60 is rotated in the opposite direction. The plane of action 80 is identical in size and shape to the plane of action 70 described above, but in this case the lines of contact $C^4$ extend in a direction of opposite hand to the lines of contact $C^2$ and $C^3$, and the initial contact is on line contact $C^5$, while the final contact is on line of contact $C^6$.

Figure 11:
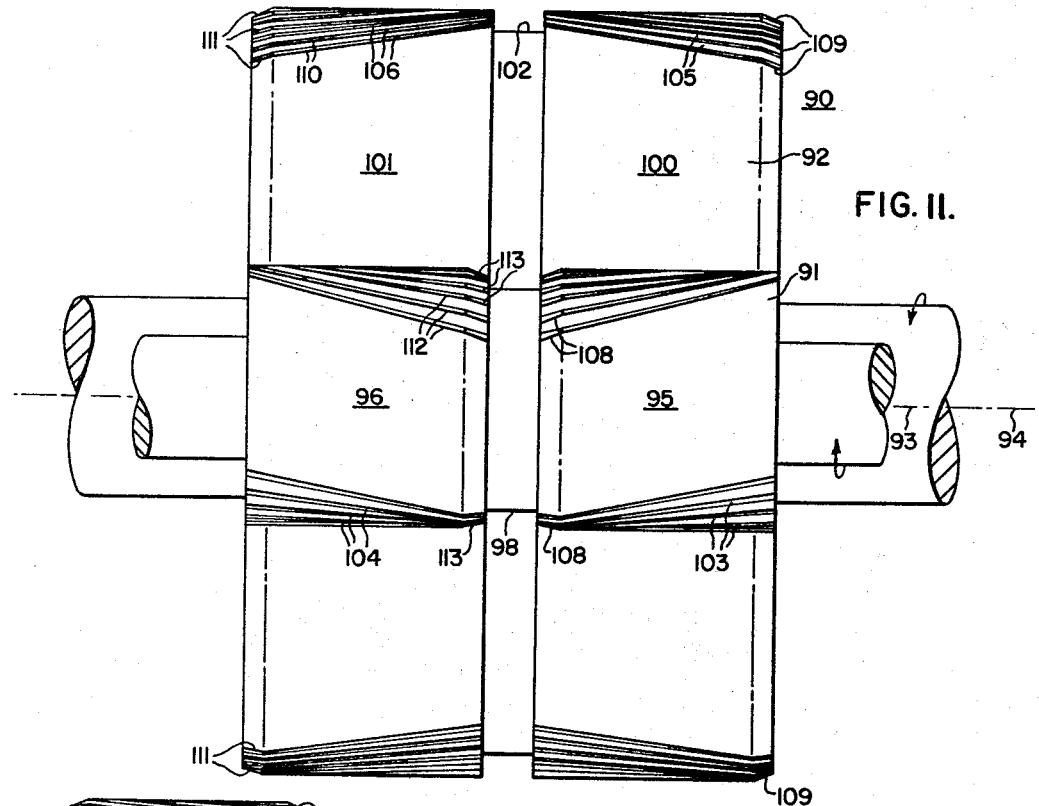
FIG. 11 is a front view of a pair of mating double helical gear members formed in accordance with the invention.

Although the invention has been thus far described in conjunction with gearing of the single helical tooth type for ease of initial explanation and comprehension, it is equally desirable and advantageous when employed in conjunction with gearing of the "double-helical or "herringbone" type. Accordingly in FIG. 11 there is shown gearing, generally designated 90, illustrating another modification of the invention.

The gearing 90 comprises a driving gear or pinion 91 of the double-helical type disposed in meshing engage- in conjunction with gearing of the "double-helical" or type and rotatable about their respective axes 93 and 94 in the direction indicated by the arrows. It will be seen that the driving gear 91 comprises, in effect, two gear portions 95 and 96 integrally joined to each other by a central portion 98 of reduced diameter and, similarly, the driven gear 92 comprises, two gear portions 100 and 101 integrally joined to each other by a central portion 102 of reduced diameter.

It will further be noted that the driving gear portion 95 is provided with a circumferential array of right-hand helical gear teeth 103 and the gear portion 96 is provided with a complementary circumferential array of left-hand helical gear teeth 104; while the driven gear portion 100 is provided with left-hand helical gear teeth 105 and the gear portion 101 is provided with complementary right-hand helical gear teeth 106.

In other words, the gear portions 95 and 100 are substantially the same as, and operate in the same manner as the gearing shown in FIG. 4 and already described. Therefore the left end portions of the driving gear teeth 103 are provided with beveled edge portions 108, while the right end portions of the driven gear teeth 105 are provided with beveled edge portions 109. The beveled portions 108 may be formed in the same manner as the beveled portions 48 in FIG. 4, while the beveled portions 109 may be formed in the same manner as the beveled portions 46 in FIG. 4.

The operation of the gear portions 95 and 100 is subject to the same analysis as shown in FIG. 7 and need not be further described.

The gear portions 96 and 101 are mirror images of the gear portions 95 and 100, hence the plane of action and the lines of contact (not shown) of the mating gear teeth 106, 104 are mirror images of the illustration in FIG. 7. Accordingly, the leading end portions 110 of the driven gear teeth 106 are provided with the beveled edge portions 111, while the trailing end portions 112 of the driving gear teeth 104 are provided with the beveled edge portions 113. Since the action of the gear teeth is otherwise the same, the beveled portions 111 and 113 are also formed in the same manner as the beveled portions 46 and 48 in FIG. 4.

It will now be seen that the invention provides, in helical and other gearing of the type in which the lines of contact are inclined with the axes of rotation, an arrangement for minimizing overloading of the leading portions of the teeth during initial engagement and of the trailing portions of the teeth during final engagement (disengagement).

Although the invention has been described in conjunction with involute toothed gears, it may be employed with other types of toothed gears, for example epicycloid gears.

Also, the gears may be disposed for rotation at any angle with respect to each other, although in the embodiments shown they are disposed for rotation about parallel axes. Examples of this type are crossed axis gears, such as "spiral" gears.

Although several embodiments have been shown, it will be obvious to those skilled in the art that it is not so limited, but is susceptible of various other changes and modifications without departing from the spirit thereof.

I claim as my invention:

1. In gearing, a driving gear, a driven gear disposed in continuous meshing engagement with said driving gear, said gears having mating gear teeth formed in such a manner that during rotation the gear teeth pass through a line of action and engage along lines of contact inclined to the line of action, the teeth on said driven gear having leading end portions subject to initial engagement by the teeth on said driving gear, and said leading end portions of the driven gear teeth having edges disposed substantially parallel to the line of contact and effective to provide a substantial line of contact upon initial engagement by the teeth of said driving gear.

2. The structure recited in claim 1, in which
the edges of the leading end portions of the driven gear teeth are formed in a manner to effect at least 20% line of contact upon initial engagement by the teeth of the driving gear.

3. The structure recited in claim 1, in which
the gear teeth are of involute profile and define helices, and
the leading end portions of the driven gear teeth are of frusto-conical shape.

4. In gearing a driving gear, a driven gear disposed in continuous meshing engagement with said driving gear, said gears having mating gear teeth formed in such a manner that during rotation the gear teeth pass through a line of action and interengage along lines of contact inclined to the line of action, the teeth of said driven gear having leading tooth portions subject to initial engagement by the teeth on said driving gear and the teeth on said driving gear having trailing tooth portions subject to final engagement by the teeth on said driven gear, said leading and trailing tooth portions having edges disposed substantially parallel to the line of action and, respectively, effective to provide a substantial line of contact upon initial engagement by the teeth on said driving gear and upon final engagement by the teeth on said driven gear.

5. The structure recited in claim 4, in which the edges of the leading and trailing tooth portions are formed in a manner to effect at least 20% line of contact upon initial engagement and final engagement, respectively.

6. The structure recited in claim 4 in which the driving and driven gears are of double helical form and the teeth are of involute profile.

7. In gearing,
a double helical driving gear,
a double helical driven gear,
said driving gear having complementary opposite hand helical gear teeth,
said driven gear having complementary opposite hand helical gear teeth disposed in continuous meshing engagement with said driving gear teeth,
said gear teeth passing through a line of action during rotation and interengaging along lines of contact inclined to the line of action,
said driven gear having leading tooth portions subject to initial engagement by said driving gear teeth and said driving gear teeth having trailing tooth portions subject to final engagement with said driven gear teeth, and
said leading and trailing tooth portions having edge portions disposed substantially parallel to the line of contact and effective to respectively provide a substantial line of contact upon initial engagement by said driving gear teeth and upon final engagement by said driven gear teeth.

8. The structure recited in claim 7, in which:
said driven gear teeth have trailing tooth portions,
said driving gear teeth have leading tooth portions, and
said last mentioned trailing and leading tooth portions are provided with edge portions disposed substantially normal to the line of contact.

9. In gearing,
a driving helical gear,
a driven helical gear disposed in continuous meshing engagement with said driving gear,
said gears having mating gear teeth formed in such a manner that during rotation the gear teeth pass through a line of action and engage along lines of contact inclined to the line of action,
the teeth on said driven gear having an annular array of leading end portions subject to initial engagement by the teeth on said driving gear,
the teeth on said driving gear having an annular array of trailing end portions subject to final engagement by the teeth on said driven gear, and
at least one of said array of tooth end portions having edges disposed substantially parallel to the line of action, and effective to provide a substantial line of contact during terminal engagement of said tooth end portions.

10. The structure recited in claim 9, in which:
the annular array of trailing end portions on the driving gear are provided with edges disposed substantially parallel to the line of action, and effective to provide a substantial line of contact upon final engagement by the teeth on the driven gear.

11. The structure recited in claim 10, in which:
the edges of the trailing end portions are formed in a manner to effect at least 20% line of contact upon final engagement.

12. The structure recited in claim 9, in which:
the driving and driven gears are of double helical form and the teeth are of involute profile.

References Cited
UNITED STATES PATENTS

| | | | |
|---|---|---|---|
| 1,859,007 | 5/1932 | Short et al. | 74—410 |
| 2,703,021 | 3/1955 | Stoeckicht | 74—410 |
| 3,011,365 | 12/1961 | Stoeckicht | 74—410 |
| 3,269,205 | 8/1966 | Neimann | 74—458 |

FRED C. MATTERN, JR., *Primary Examiner.*

DAVID J. WILLIAMOWSKY, *Examiner.*

C. J. HUSAR, *Assistant Examiner.*